(12) United States Patent
Chae et al.

(10) Patent No.: US 10,584,779 B2
(45) Date of Patent: Mar. 10, 2020

(54) TRANSMISSION FOR ELECTRIC VEHICLE

(71) Applicants: Hyundai Motor Company, Seoul (KR); Kia Motors Corporation, Seoul (KR)

(72) Inventors: Min Ho Chae, Incheon (KR); Yong Uk Shin, Suwon-si (KR); Soon Ki Eo, Ansan-si (KR); Ma Ru Kang, Yongin-si (KR); Sun Sung Kwon, Anyang-si (KR); Chon Ok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 30 days.

(21) Appl. No.: 16/155,601

(22) Filed: Oct. 9, 2018

(65) Prior Publication Data

US 2019/0368587 A1 Dec. 5, 2019

(30) Foreign Application Priority Data

Jun. 1, 2018 (KR) .......................... 10-2018-0063161

(51) Int. Cl.
*F16H 37/06* (2006.01)

(52) U.S. Cl.
CPC ..... *F16H 37/06* (2013.01); *F16H 2200/0021* (2013.01); *F16H 2200/0039* (2013.01); *F16H 2200/2005* (2013.01); *F16H 2200/2033* (2013.01); *F16H 2200/2064* (2013.01); *F16H 2200/2094* (2013.01)

(58) Field of Classification Search
USPC ....................................................... 475/218
See application file for complete search history.

(56) References Cited

U.S. PATENT DOCUMENTS 9,546,720 B2 * 1/2017 Janson .................. F16H 37/022

FOREIGN PATENT DOCUMENTS

DE 102017205662 A1 * 10/2018 ........... B60K 17/165
KR 10-2017-0018220 A 2/2017

* cited by examiner

*Primary Examiner* — Dirk Wright
(74) *Attorney, Agent, or Firm* — Morgan, Lewis & Bockius LLP

(57) ABSTRACT

A transmission for an electric vehicle may include an input shaft connect with a motor; a planetary gear set having a first rotation element directly connected to the input shaft, a second rotation element and a third rotation element; an output shaft having an output gear; a first drive gear provided in the third rotation element of the planetary gear set; a first driven gear disposed at the output shaft to be rotatable to engage with the first drive gear; a second drive gear connected to or disconnected from the input shaft; a second driven gear engaged with the second drive gear and directly connected to the first driven gear; a third drive gear directly connected to the second rotation element of the planetary gear set; and a third driven gear engaged with the third drive gear and directly connected to the output shaft.

8 Claims, 10 Drawing Sheets

TRANSMISSION FOR ELECTRIC VEHICLE

CROSS REFERENCE TO RELATED APPLICATION

The present application claims priority to Korean Patent Application No. 10-2018-0063161 filed on Jun. 1, 2018, in the Korean Intellectual Property, the entire contents of which is incorporated herein for all purposes by this reference.

BACKGROUND OF THE INVENTION

Field of the Invention

The present invention relates to a transmission for an electric vehicle, and more particularly, a technology related to the configuration of a power train that allows a vehicle to secure sufficient running performance while using a drive motor with as small capacity as possible.

Description of Related Art

An electric vehicle provides the driving force necessary for driving the vehicle through a drive motor on behalf of an engine. The price of drive motor generally increases in proportion to its capacity or size. When the size of the drive motor increases, the range of driving torque to provide is widened, but it is also a factor that deteriorates fuel efficiency by the increase of vehicle weight.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission for an electric vehicle configured for securing enough driving performance such as maximum speed, acceleration performance, and hill climbing performance of the vehicle while using a drive motor as a small capacity as possible, securing the driving performance of the required vehicle while reducing the cost of the manufacturing the vehicle and improving the vehicle mountability by making the overall length of the transmission as short as possible.

A transmission for an electric vehicle In various aspects of the present invention may include, an input shaft connected to a motor; a planetary gear set of which a first rotation element is directly connected to the input shaft, a second rotation element is connected to or disconnected from the input shaft, and a third rotation element is disposed to be fixable; an output shaft disposed in parallel with the input shaft and provided with an output gear; a first drive gear provided in the third rotation element of the planetary gear set; a first driven gear disposed at the output shaft to be rotatable to engage with the first drive gear; a second drive gear connected to or disconnected from the input shaft; a second driven gear engaged with the second drive gear and directly connected to the first driven gear; a third drive gear directly connected to the second rotation element of the planetary gear set; and a third driven gear engaged with the third drive gear and directly connected to the output shaft.

The planetary gear set may include a single pinion planetary gear set; the first rotation element may be a sun gear; the second rotation element may be a carrier; and the third rotation element may be a ring gear.

The carrier of the planetary gear set may be connected to or disconnected from the input shaft by the first clutch; the ring gear of the planetary gear set may be disposed at a transmission housing to be fixable by the second clutch; and the second drive gear may be connected to or disconnected from the input shaft by the third clutch.

The first clutch may include a friction clutch which can continuously control a delivery torque; and the second clutch and the third clutch include a gear engage type clutch.

The input shaft may be further provided with a fourth driven gear; and a driveshaft of the motor may be further provided with a fourth drive gear engaged with the fourth driven gear, so that the input shaft is connected to the motor through the fourth driven gear and the fourth drive gear.

Furthermore, a transmission for an electric vehicle according to an exemplary embodiment of the present invention may include, an input shaft connected to a motor; a planetary gear set of which a first rotation element is directly connected to the input shaft, a second rotation element is connected to or disconnected from the input shaft, and a third rotation element is disposed to be fixable; an output shaft disposed in parallel with the input shaft and provided with an output gear; a first drive gear provided at the third rotation element of the planetary gear set; a first driven gear disposed at the output shaft to be rotatable to be engaged with the first drive gear; a second drive gear provided at the input shaft; a second driven gear disposed at the output shaft to be rotatable to be engaged with the second drive gear and connected to or disconnected from the first driven gear; a third drive gear directly connected to the second rotation element of the planetary gear set; and a third driven gear engaged with the third drive gear and directly connected to the output shaft.

The planetary gear set may include a single pinion planetary gear; the first rotation element of the planetary gear set may be a sun gear set directly connected to the input shaft; the second rotation element of the planetary gear set may be a carrier connected to or disconnected from the input shaft by the first clutch; and the third rotation element of the planetary gear set may be a ring gear disposed at a transmission housing to be fixable by the second clutch; and the second driven gear may be connected to or disconnected from the first driven gear by the third clutch.

The first clutch may include a friction clutch which can continuously control a delivery torque; and the second clutch and the third clutch are configured a gear engage type clutch.

According to the transmission for the electric vehicle, it is configured to secure enough driving performance such as maximum speed of the vehicle, acceleration performance, and hill climbing performance while using a drive motor as a small capacity as possible, secure the driving performance of the required vehicle while reducing the cost of the manufacturing the vehicle and improve the vehicle mountability by making the overall length of the transmission as short as possible.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
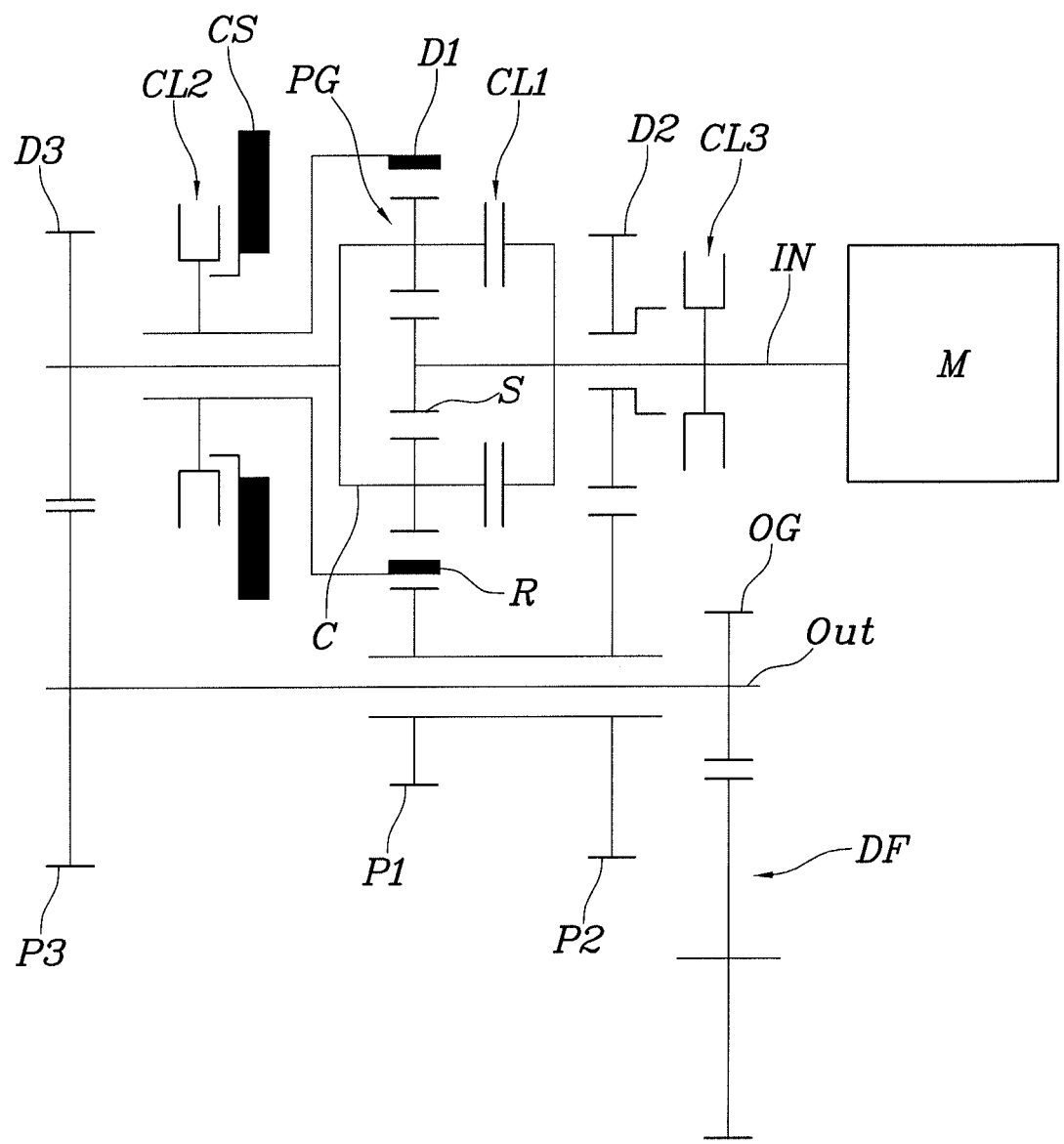
FIG. 1 is a drawing illustrating various exemplary embodiments of a transmission for an electric vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Referring to FIG. 1, a transmission for an electric vehicle according to various exemplary embodiments of the present invention may include, an input shaft IN connect with a motor M; a planetary gear set PG of which a first rotation element is directly connected to the input shaft IN, a second rotation element is connected to or disconnected from the input shaft IN, and a third rotation element is disposed to be fixable; an output shaft OUT disposed in parallel with the input shaft IN and provided with an output gear OG; a first drive gear D1 provided in the third rotation element of the planetary gear set PG; a first driven gear P1 rotatably disposed on the output shaft OUT to be rotatable to engage with the first drive gear D1; a second drive gear D2 connected to or disconnected from the input shaft IN; a second driven gear P2 engaged with the second drive gear D2 and directly connected to the first driven gear P1; a third drive gear D3 directly connected to the second rotation element of the planetary gear set PG; and a third driven gear P3 engaged with the third drive gear D3 and directly connected to the output shaft OUT.

In the exemplary embodiment of the present invention, the planetary gear set PG may include a single pinion planetary gear set PG, the first rotation element may be a sun gear S, the second rotation element may be a carrier C, and the third rotation element may be a ring gear R.

Therefore, the carrier C of the planetary gear set PG may be connected to or disconnected from the input shaft IN by the first clutch CL1, the ring gear R of the planetary gear set PG may be disposed at transmission housing CS to be fixable by the second clutch CL2, and the second drive gear D2 may be connected to or disconnected from the input shaft IN by the third clutch CL3.

The first clutch CL1 is configured by a friction clutch configured for continuously controlling the delivery torque, and the second clutch CL2 and the third clutch CL3 are configured by a gear engage type clutch.

That is, the first clutch CL1 is configured by a clutch in which the delivery torque may be continuously changed while the frictional force is varied under control. For example, a disk clutch, and the like may be used.

As the gear engage type clutch, for example, a dog clutch or a synchronizer with a synchronizer ring may be used. Since it is possible to perform precise speed control by the motor M In an exemplary embodiment of the present invention, the second clutch CL2 and the third clutch CL3 include the dog clutch, configuring relatively inexpensive and increasing the travel distance of the vehicle because the power is not consumed to maintain the engaged state separately after the engaging.

In the exemplary embodiment of the present invention, the first drive gear D1 is integrally including the external circumference of the ring gear R.

The operation of the various exemplary embodiments of the present invention constructed as described above will be described.

Figure 2:
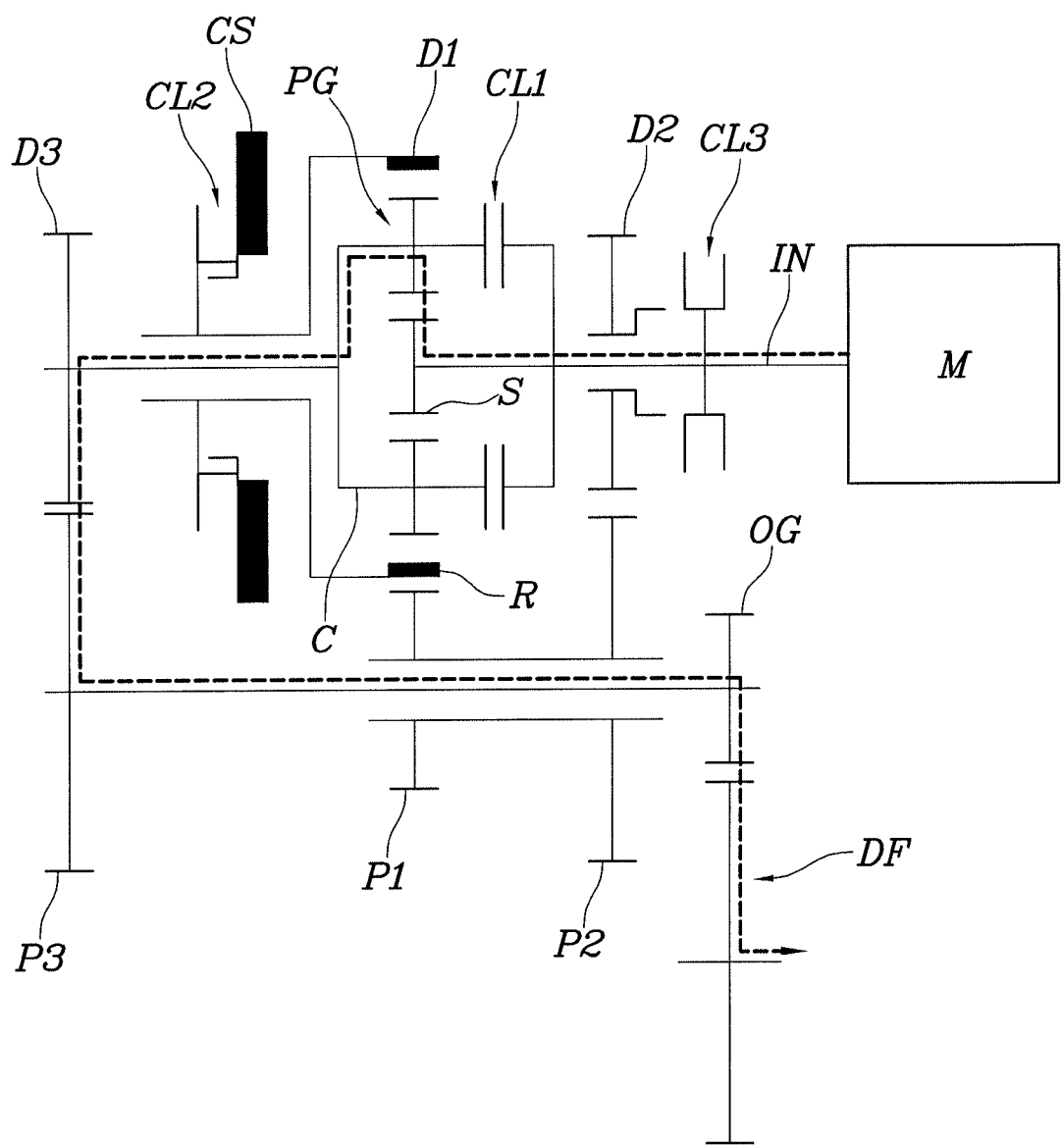
FIG. 2 is a drawing showing the state where the transmission of FIG. 1 realizes a first speed stage.

As from the state of FIG. 1 to FIG. 2, when the motor M is driven with engaging the second clutch CL2 to fix the ring gear R of the planetary gear set PG, the power of the motor M is input to the sun gear S and decelerated by the carrier C, and, transmitted to the output shaft OUT through the third drive gear D3 and third driven gear P3, so that the output gear OG draws out a first speed stage output to a differential DF.

FIG. 3, FIG. 4, FIG. 5 and FIG. 6 are drawings explaining the process of shifting from the running state with the first speed stage of FIG. 2 to a second speed stage in turn. During the present process, the state where power is continuously transmitted to the output shaft OUT is maintained, securing the excellent shift feel.

Figure 3:
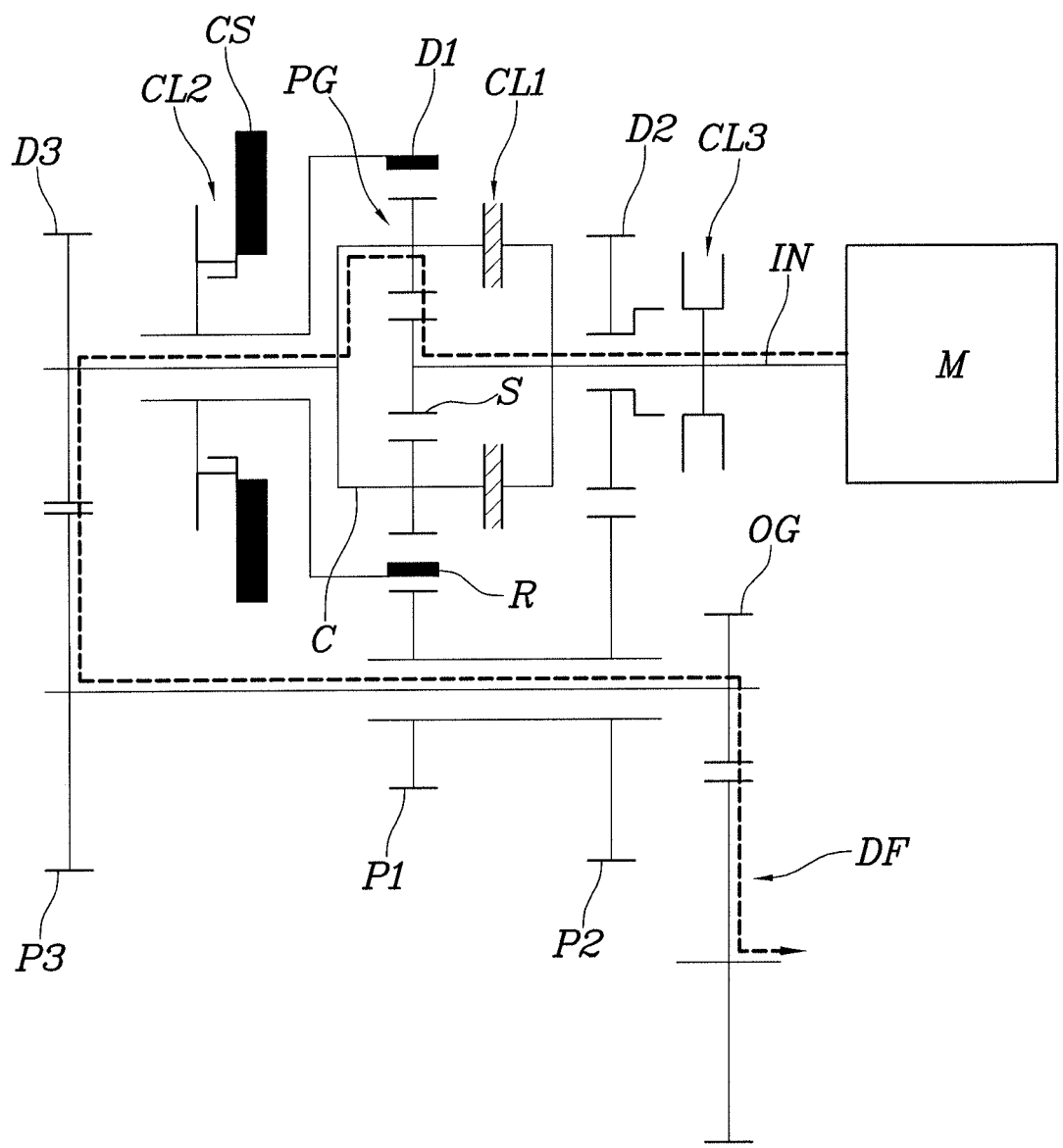
FIG. 3, FIG. 4, FIG. 5 and FIG. 6 are drawings explaining the process of shifting from the state of FIG. 2 to a second speed stage.

FIG. 3 shows a state in which the first clutch CL1 is slipped so that some torque is transferred to the carrier C. Through this, the reaction torque of the ring gear R applied to the second clutch CL2 is canceled so that the second clutch CL2 may be disengaged easily.

Figure 4:
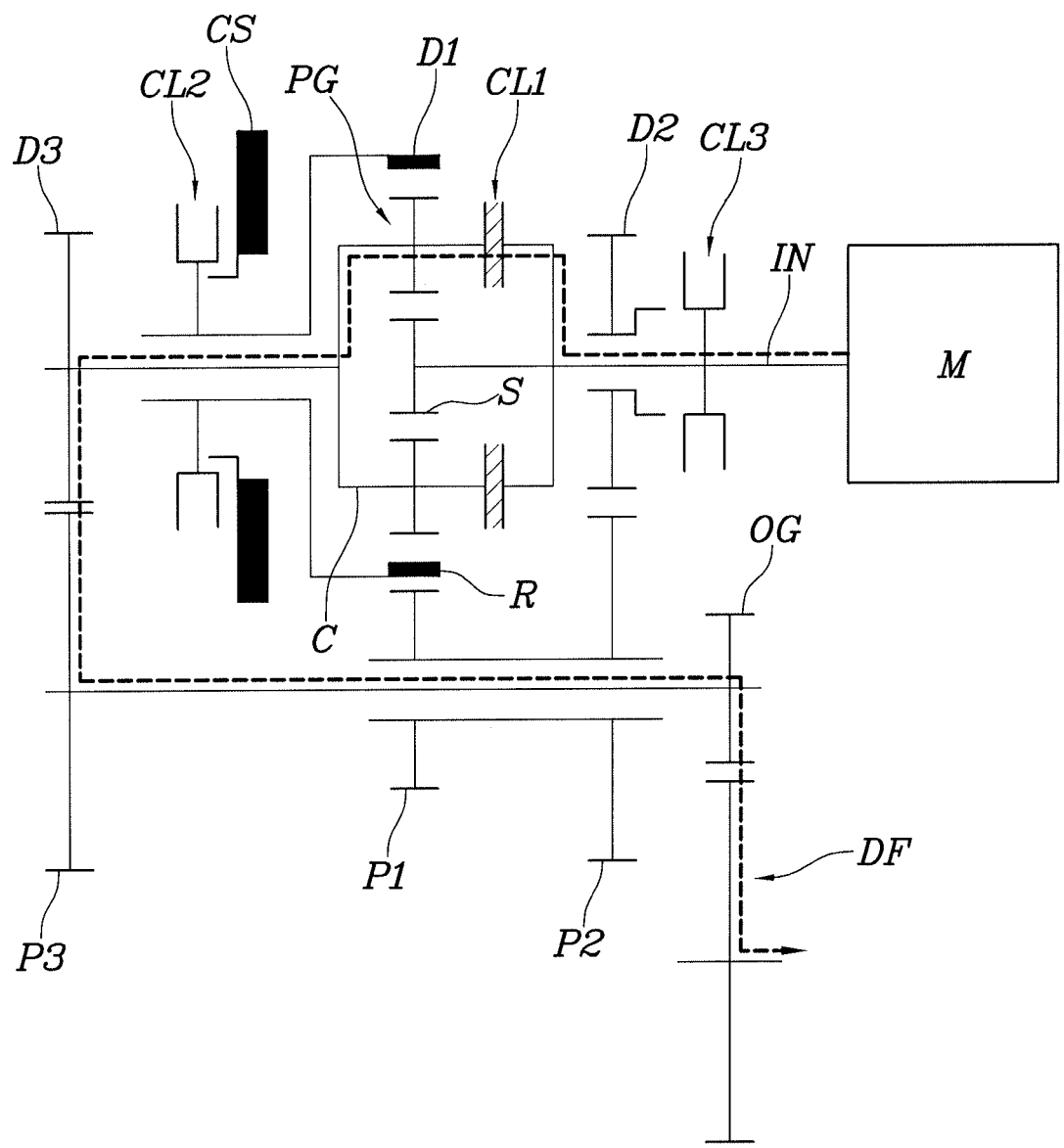
Figure 5:
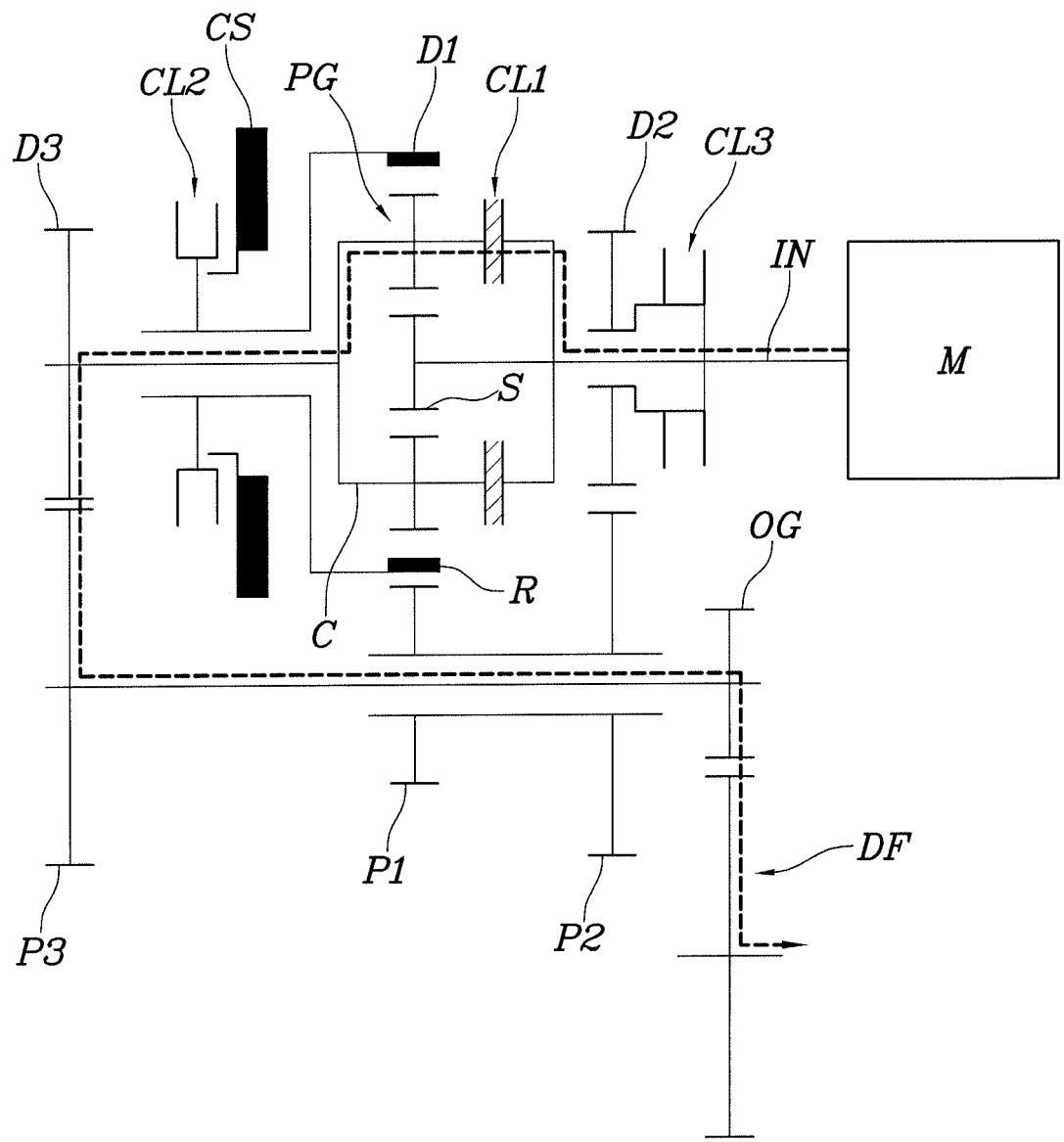

FIG. 4 shows a state in which the second clutch CL2 is disengaged and the torque is continuously transmitted to the first clutch CL1 as described above. As a result of transmitted torque, the ring gear R of the planetary gear set PG also rotates together to increase the speed of the second driven gear P2 through the first drive gear D1 and the first driven gear P1. According to this, the speed of the second drive gear D2 also increases, so that the speed of the second drive gear D2 becomes equal to the speed of the input shaft IN to engage the third clutch CL3 as shown in FIG. 5.

Figure 6:
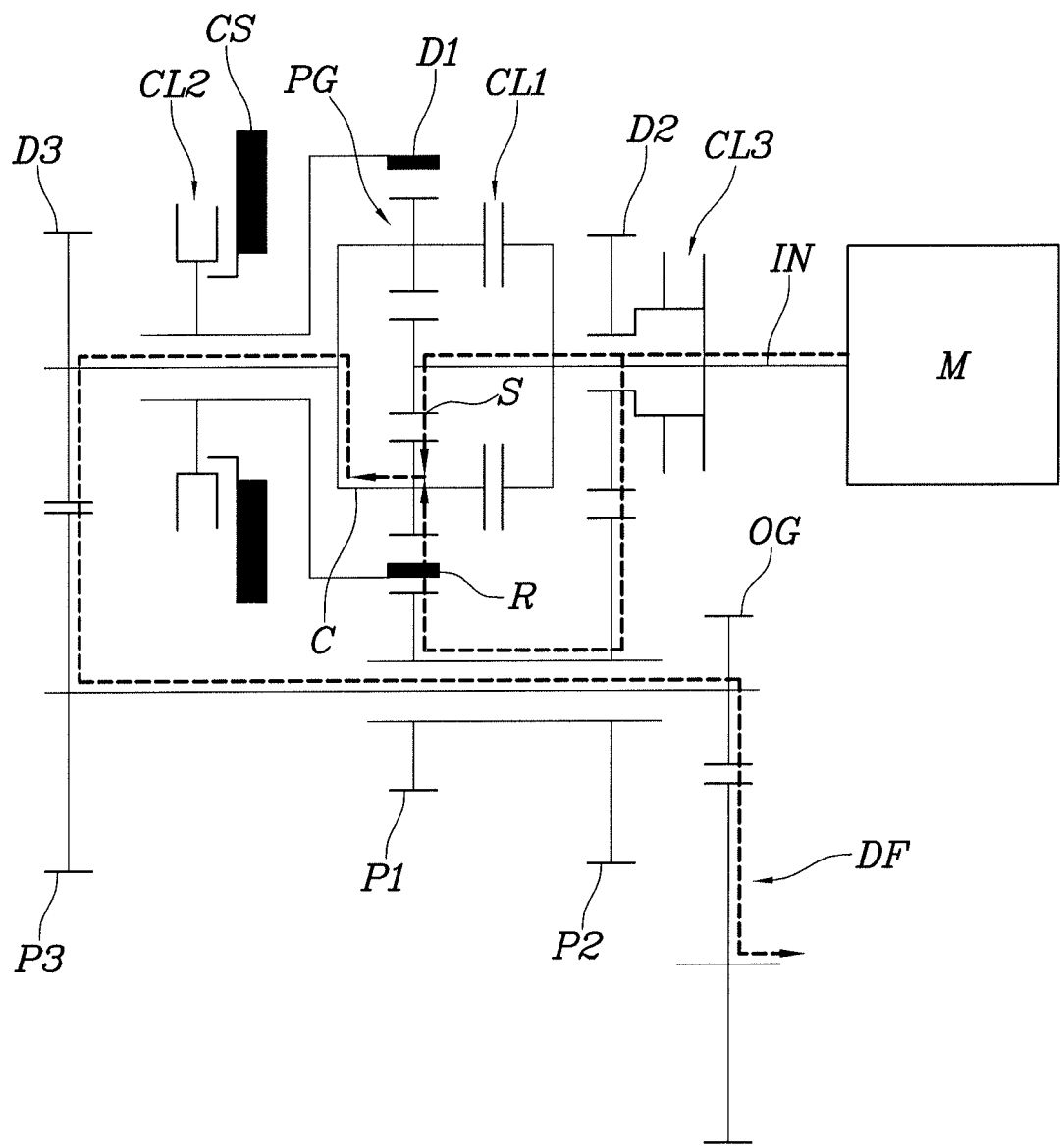

Thereafter, the first clutch CL1 is disengaged as shown in FIG. 6, the power of the motor M is transmitted to the path passing through the sun gear S and the carrier C of the planetary gear set PG and the path sequentially passing through the second drive gear D2, the second driven gear P2, the first driven gear P1, the first drive gear (ring gear R) and carrier C together, so that the running state of the second speed stage in which the power of the second speed stage is drawn out to the output shaft OUT through the carrier C, the third drive gear D3 and third driven gear P3 is achieved.

Figure 7:
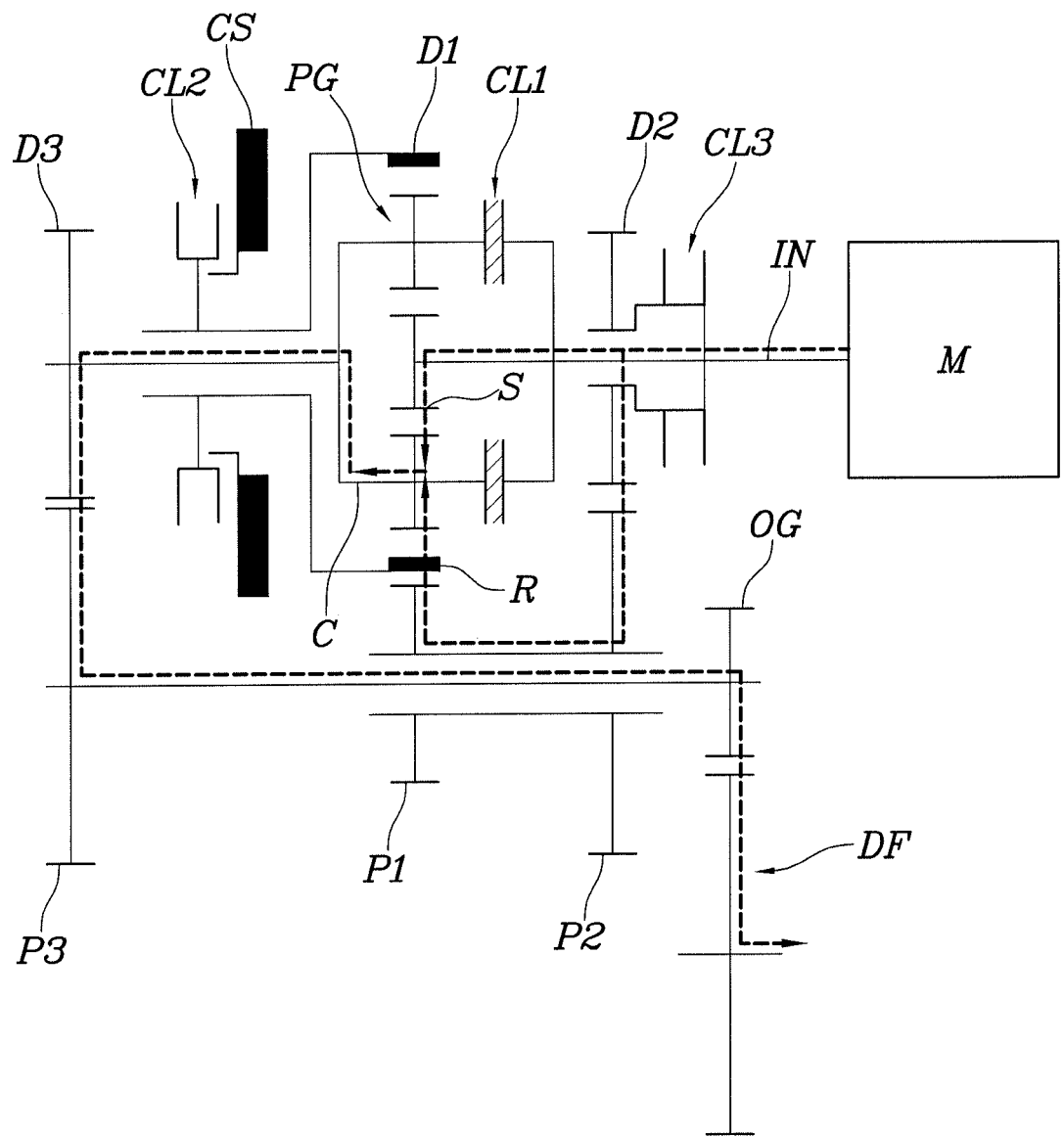
FIG. 7 and FIG. 8 are drawings explaining the process of shifting from the state of FIG. 6 to a third speed stage.
Figure 8:
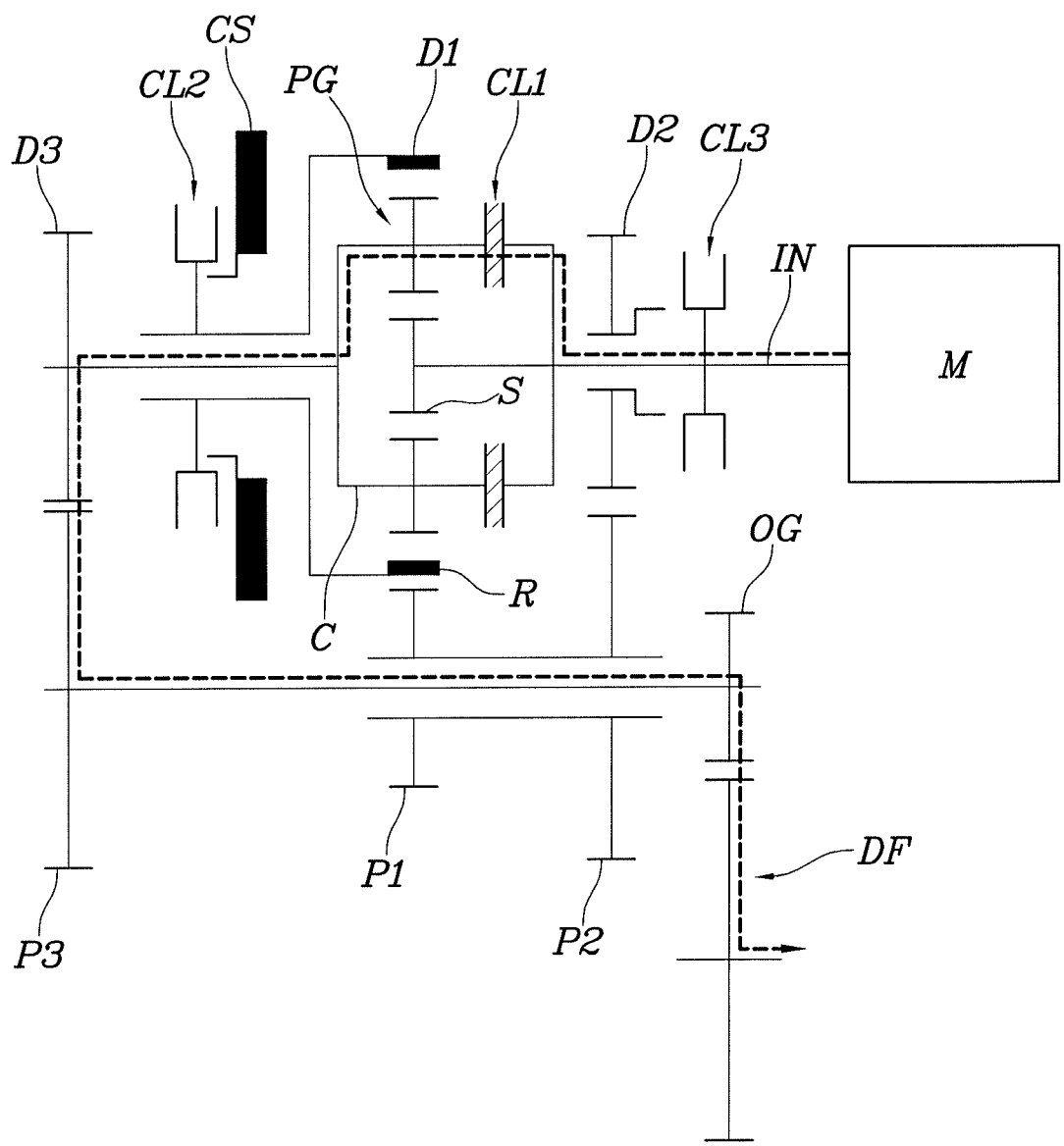

FIG. 7 shows the state in which slipping is generated in the first clutch CL1 for shifting from the running state of the second speed stage to a third speed stage, and FIG. 8 shows the state in which the third clutch CL3 is disengaged from the state of the FIG. 7, the first clutch CL1 is completely engaged, and the power of the motor M provided to the input shaft IN is transmitted to the third drive gear D3 through the planetary gear set PG as it is without shifting to pass through the third driven gear P3, so that the power of the third speed stage is drawn out to the output gear OG.

As described above, the present exemplary embodiment provides the third speed stage, so that it is possible to secure sufficient driving performance such as maximum speed, acceleration performance and hill climbing performance of the vehicle while using while using a drive motor M as a small capacity as possible, securing the driving performance of the required vehicle while reducing the cost of the manufacturing the vehicle and improving the vehicle mountability by making the overall length of the transmission as short as possible.

Figure 9:
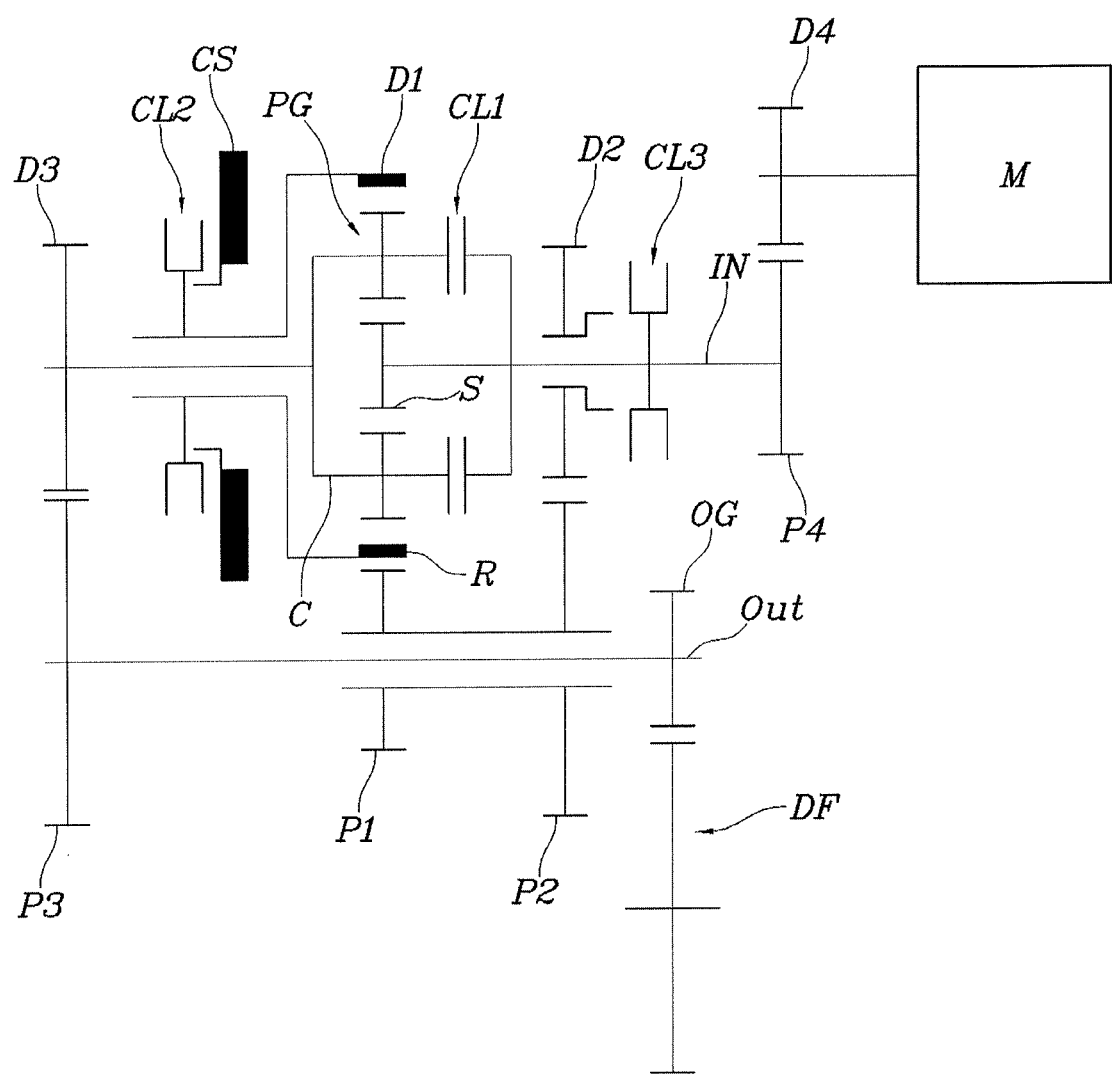
FIG. 9 is a drawing illustrating various exemplary embodiments of a transmission for an electric vehicle according to an exemplary embodiment of the present invention.

FIG. 9 shows the various exemplary embodiments of the present invention. Only the configuration, in which the input shaft IN is further provided with a fourth driven gear P4, a driveshaft of the motor M is further provided with a fourth drive gear D4 engaged with the fourth driven gear P4, the input shaft IN is connected to the motor M through the fourth driven gear P4 and the fourth drive gear D4, is different from the various exemplary embodiments of the present invention, and the remaining configuration is equal to the various exemplary embodiments.

That is, the configuration can further increase a reduction gear ratio through the fourth drive gear D4 and the fourth driven gear P4.

Figure 10:
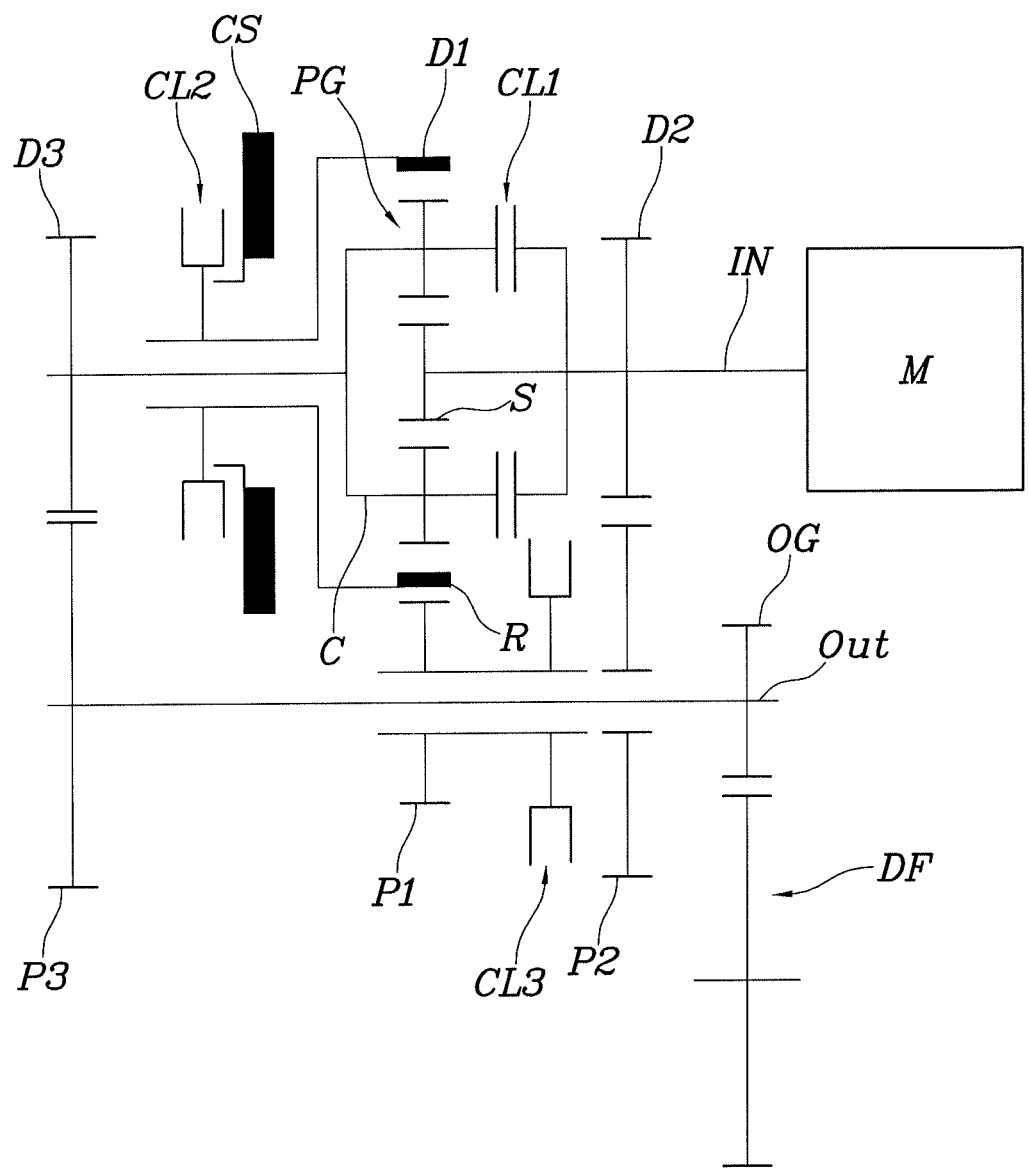
FIG. 10 is a drawing illustrating various exemplary embodiments of a transmission for an electric vehicle according to an exemplary embodiment of the present invention.

FIG. 10 shows the various exemplary embodiments of the present invention. Only the configuration, in which the second driven gear P2 is connected to or disconnected from the first driven gear P1 by the third clutch CL3 instead of mounting the second drive gear D2 connected to or disconnected from the input shaft IN, is different from the various exemplary embodiments of the present invention, and the remaining configuration is equal to the various exemplary embodiments.

That is, the exemplary embodiment of FIG. 10 is configured to include an input shaft IN connected to a motor M; a planetary gear set PG of which a first rotation element is directly connected to the input shaft IN, a second rotation element is connected to or disconnected from the input shaft IN, and a third rotation element is disposed to be fixable; an output shaft OUT disposed in parallel with the input shaft IN and provided with an output gear OG; a first drive gear D1 provided at the third rotation element of the planetary gear set PG; a first driven gear P1 disposed at the output shaft OUT to be rotatable to be engaged with the first drive gear D1; a second drive gear D2 provided at the input shaft IN; a second driven gear P2 disposed at the output shaft OUT to be rotatable to be engaged with the second drive gear D2 and connected to or disconnected from first driven gear P1; a third drive gear D3 directly connected to the second rotation element of the planetary gear set PG; and a third driven gear P3 engaged with the third drive gear D3 and directly connected to the output shaft OUT.

The planetary gear set PG includes a single pinion planetary gear set PG, the first rotation element of the planetary gear set PG is a sun gear S directly connected to the input shaft IN, the second rotation element of the planetary gear set PG is a carrier C connected to or disconnected from the input shaft IN by the first clutch CL1, the third rotation element of the planetary gear set PG is a ring gear R disposed at a transmission housing CS to be fixable by the second clutch CL2, and the second driven gear P2 is connected to or disconnected from the third clutch CL3 by the first driven gear P1.

Furthermore, the first clutch CL1 is configured by a friction clutch which can continuously control the delivery torque, and the second clutch CL2 and the third clutch CL3 will be preferably configured by a gear engage type clutch.

The detailed shifting process is almost the same as the various exemplary embodiments of the present invention, so a detailed explanation is omitted.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, the transmission comprising:
    an input shaft fixedly connected to a motor;
    a planetary gear set of which a first rotation element is fixedly connected to the input shaft, a second rotation element is engaged to the first rotation element and selectively connectable to the input shaft, and a third rotation element is engaged to the second rotation element and disposed to be fixable;
    an output shaft disposed in parallel with the input shaft and provided with an output gear;
    a first drive gear provided in the third rotation element of the planetary gear set;
    a first driven gear rotatably mounted on the output shaft and engaged with the first drive gear;
    a second drive gear rotatably mounted on the input shaft and selectively connectable to the input shaft;
    a second driven gear rotatably mounted on the output shaft, engaged with the second drive gear, and fixedly connected to the first driven gear;
    a third drive gear fixedly connected to the second rotation element of the planetary gear set; and a third driven gear engaged with the third drive gear and fixedly connected to the output shaft.

2. The transmission for the vehicle of claim 1, wherein
the planetary gear set includes a single pinion planetary gear set;
the first rotation element is a sun gear;
the second rotation element is a carrier; and
the third rotation element is a ring gear.

3. The transmission for the vehicle of claim 2, wherein
the carrier of the planetary gear set is selectively connectable to the input shaft by a first clutch;
the ring gear of the planetary gear set is selectively connectable to a transmission housing a second clutch; and
the second drive gear is selectively connectable to the input shaft by a third clutch.

4. The transmission for the vehicle of claim 3, wherein
the first clutch includes a friction clutch which is configured to continuously control a delivery torque; and
the second clutch and the third clutch include a gear engage type clutch.

5. The transmission for the vehicle of claim 1, wherein
the input shaft is further provided with a fourth driven gear; and
a driveshaft of the motor is further provided with a fourth drive gear engaged with the fourth driven gear, so that the input shaft is connected to the motor through the fourth driven gear and the fourth drive gear.

6. A transmission for a vehicle, the transmission comprising:
an input shaft fixedly connected to a motor;
a planetary gear set of which a first rotation element is fixedly connected to the input shaft, a second rotation element is engaged to the first rotation element and selectively connectable to the input shaft, and a third rotation element is engaged to the second rotation element and disposed to be fixable;
an output shaft disposed in parallel with the input shaft and provided with an output gear;
a first drive gear provided in the third rotation element of the planetary gear set;
a first driven gear rotatably mounted on the output shaft and engaged with the first drive gear;
a second drive gear provided at the input shaft;
a second driven gear rotatably mounted on the output shaft, engaged with the second drive gear, and selectively connectable to the first driven gear;
a third drive gear fixedly connected to the second rotation element of the planetary gear set; and
a third driven gear engaged with the third drive gear and fixedly connected to the output shaft.

7. The transmission for the vehicle of claim 6, wherein
the planetary gear set includes a single pinion planetary gear;
the first rotation element of the planetary gear set is a sun gear set fixedly connected to the input shaft;
the second rotation element of the planetary gear set is a carrier selectively connectable to the input shaft by a first clutch; and
the third rotation element of the planetary gear set is a ring gear selectively connectable to a transmission housing by a second clutch; and
the second driven gear is selectively connectable to the first driven gear by a third clutch.

8. The transmission for the vehicle of claim 7, wherein
the first clutch includes a friction clutch which is configured to continuously control a delivery torque; and
the second clutch and the third clutch are configured a gear engage type clutch.

* * * * *